United States Patent [19]
Scott et al.

[11] Patent Number: 5,762,756
[45] Date of Patent: Jun. 9, 1998

[54] METHODS AND APPARATUS FOR PULPING AND DEINKING

[75] Inventors: Don L. Scott; William J. Fondow, both of Middletown; Albert F. Kelly, West Chester; David C. Grantz, Hamilton; Peter Seifert, Middletown, all of Ohio

[73] Assignee: The Black Clawson Company, Middletown, Ohio

[21] Appl. No.: 651,812

[22] Filed: May 21, 1996

Related U.S. Application Data

[63] Continuation-in-part of Ser. No. 342,852, Nov. 21, 1994, abandoned.

[51] Int. Cl.$^6$ ............................................ D21B 1/32
[52] U.S. Cl. .................... 162/4; 241/21; 241/24
[58] Field of Search ............... 162/4, 5, 56; 241/21, 241/24

[56] References Cited

U.S. PATENT DOCUMENTS

| | | | |
|---|---|---|---|
| 1,579,461 | 4/1926 | Winstock . | |
| 1,705,907 | 3/1929 | DeWitt . | |
| 2,139,274 | 12/1938 | Justice et al. | 92/37 |
| 3,293,117 | 12/1966 | Pennington, Jr. et al. | 162/236 |
| 4,214,947 | 7/1980 | Berger | 162/18 |
| 4,938,426 | 7/1990 | Koenig | 241/222 |
| 5,302,243 | 4/1994 | Ishibashi et al. | 162/5 |
| 5,316,621 | 5/1994 | Kitao et al. | 162/4 |

OTHER PUBLICATIONS

M$^c$ Bride, Don, "Seperate Pulping of Magazine, ONP Yields Cost, Consistency Benefits", *Paper Recycling: Strategies, Economics and Technology*, Miller Freeman (San Francisco, Ca.) pp. 100–104.

Gilkey et al, "Cold Dispersion Unit Boosts Deinking Efficiency at Japanese Tissue Mills", *Paper Recycling: Strategies, Economics and Technology*, Miller Freeman (San Francisco, Ca.) pp. 159–162.

"New Dry Process Intrigues DEinkers", Paper Trade Journal, Oct. 26, 1959.

Ergebnisse mit Hochkonsistenz-Stofflosern, 36 Jahrgang Hef 3 1982 with English Translation.

Lannoye Pulper, Bulletin 346.

*Primary Examiner*—Brenda Adel Lamb
*Attorney, Agent, or Firm*—Biebel & French

[57] ABSTRACT

Methods and apparatus for recycling office waste paper and the like of the type having ink and laser print particles coated thereon. The waste paper is simultaneously pulped and ink particles dispersed by kneading the waste paper in the form of a high solids content aqueous mixture or sludge. After the simultaneous pulping and dispersing, no additional dispersion step is needed to form deinked paper stock The high solids content aqueous mixture or sludge is diluted and forwarded to wet deinking separation devices such as a froth flotation unit or the like. The thus treated pulp is washed and results in the formation of a high quality pulp stock ready for bleaching and/or paper making procedures.

13 Claims, 5 Drawing Sheets

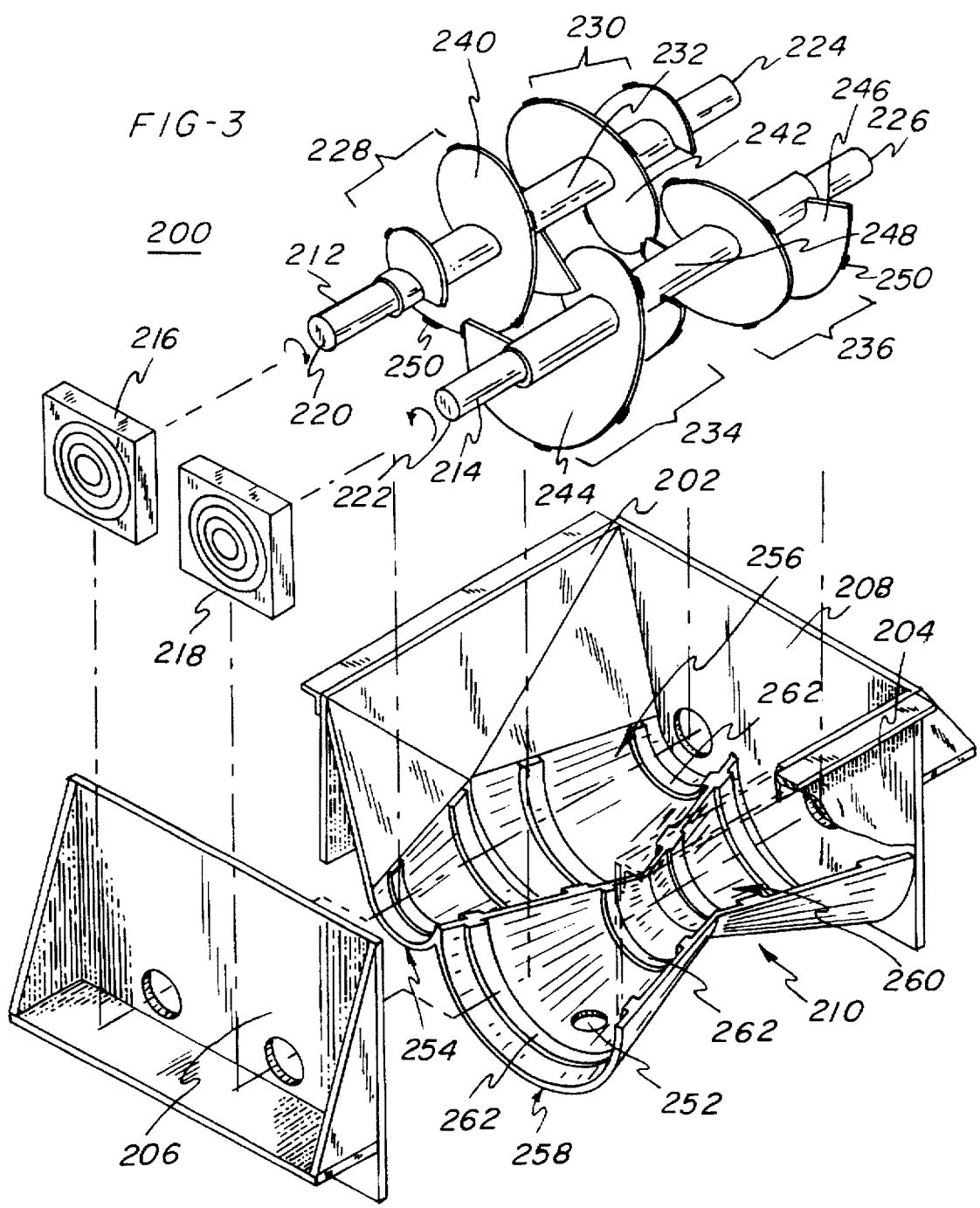

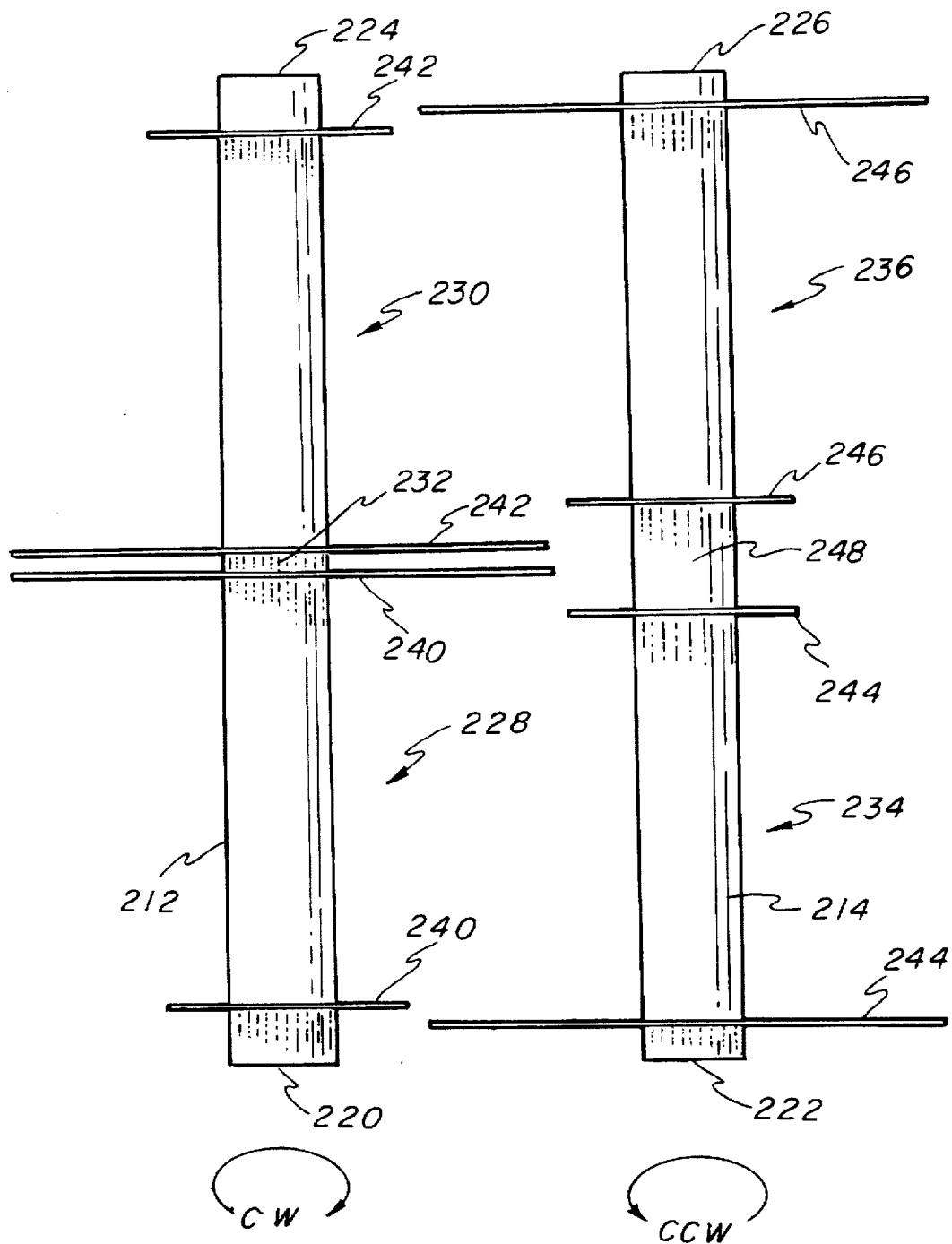

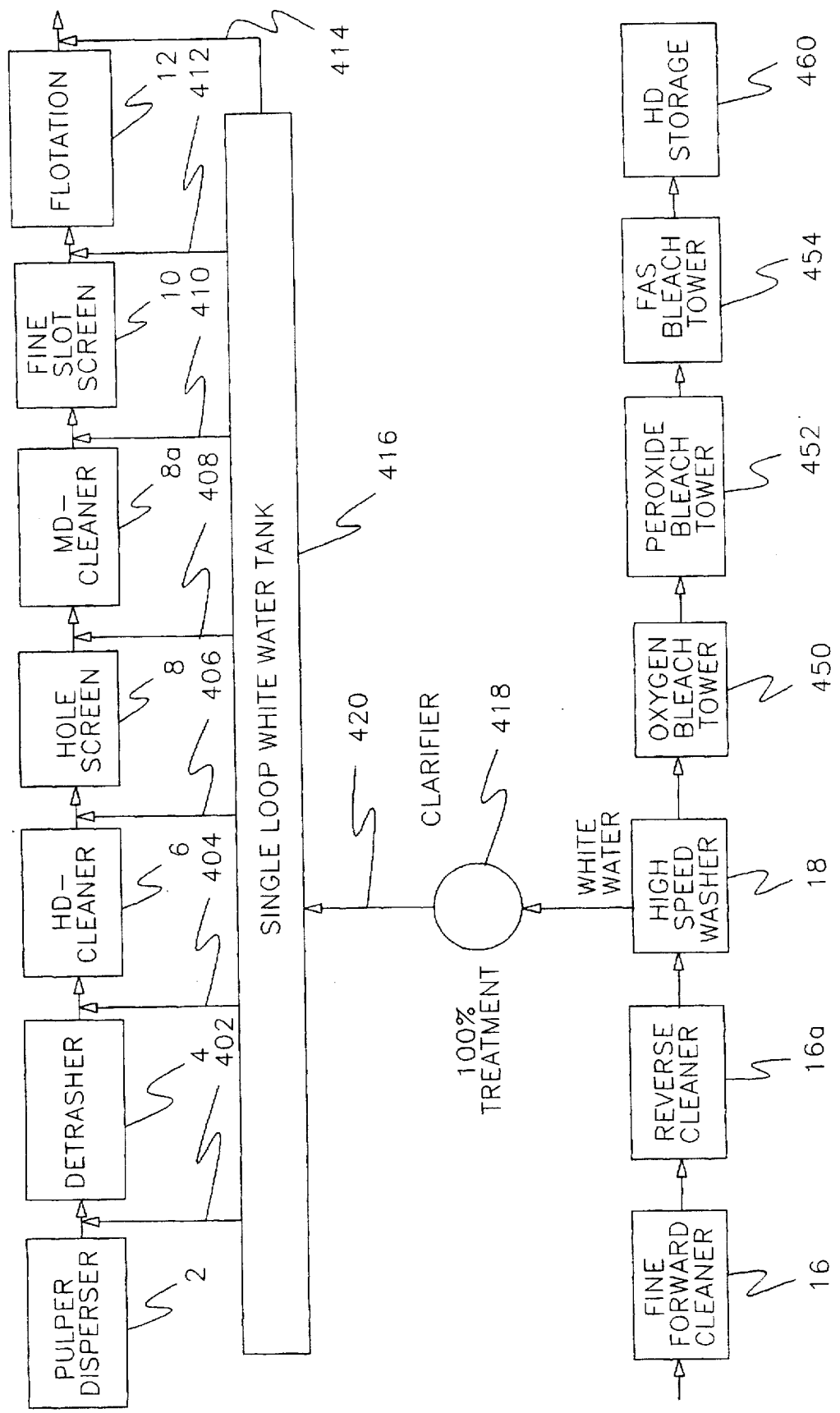

METHODS AND APPARATUS FOR PULPING AND DEINKING

This application is a continuation in part of application, Ser. No. 08/342,852 filed Nov. 21, 1994 now abandoned.

FIELD OF THE INVENTION

The present invention pertains to methods and apparatus for pulping and deinking cellulosic materials such as office waste paper.

BACKGROUND OF THE INVENTION

The use of recycled office waste papers as a precursor source for paper making fibers has become increasingly popular. Recyclable office waste paper often contains ink and laser jet print particles. The latter actually exist as a multiplicity of particles or carbonized specs along the waste paper surface. The former may be described as comprising a mixture of pigment or organic dye, binder and solvent. Of course, in order to recycle such office waste, the ink, including laser print particles, must be removed in order to provide high quality pulp stock for production of high brightness papers.

Traditionally, deinking is accomplished with chemical additives and a plurality of mechanical process steps including the sequential steps of thickening the pulp, dispersing the ink particles in the thickened pulp in a kneading machine or the like, followed by diluting the kneaded pulp. Then the pulp is forwarded to a flotation cell where the dispersed ink particles are separated via air froth flotation or the like on the surface of the pulp slurry.

The aforementioned deinking processes normally contemplate usage of a repetition of the thickening, dispersing, and flotation steps. This accordingly presents an imposing capital expenditure especially with regard to the thickening (i.e. washing) machines since these are large machines, requiring excessive floor space, and are expensive to purchase. The same detriments exist for the dispersing step since the performance of these steps again requires expensive equipment.

U.S. Pat. No. 4,668,339 (Terry) discloses a process for dry deinking of secondary fiber sources wherein air dry secondary fiber batches are shredded to produce discrete fibers and fines. The fines include ink bearing fines or ink particles which are "dry" separated from the fibers via vacuum/screen arrangements. Additionally, wet deinking or cleaning steps may be interposed between this dry shredding and the subsequent pulping of the fibers in an aqueous slurry.

Despite the efforts of the prior art, there remains a need for a process for deinking used office waste paper that will minimize the need for employment of successive thicken, disperse flotation steps so that capital expenditure for this equipment will accordingly be minimized.

A more specific need exists for a deinking process in which pulping and ink dispersion may be achieved simultaneously by use of the same equipment so that pre-pulping treatments such as those taught by the '339 patent supra. may be eliminated.

SUMMARY OF THE INVENTION

These and other objects are met by the present invention. Basically, the inventive methods pertain to the discovery that raw office waste paper of the type imprinted with ink and laser jet print can be simultaneously pulped and deinked in a high solids content, viscous aqueous mixture.

This step of simultaneous pulping and deinking may be carried out without any upstream pretreatment steps. Raw, untreated waste paper, such as office waste paper, is subjected to a kneading or shearing action in a viscous aqueous mixture having a solids content of greater than 20 wt. % solids. Use of more water in the mixture than that specified actually retards the mechanical kneading or shearing action of the waste paper as it is frictionally kneaded or sheared by the machine action and action of the high solids waste paper itself rubbing against other waste paper.

Use of this simultaneous pulping and deinking step has prover successful in separating the waste paper into a homogenous mass of substantially discrete fibers and dispersing the ink and laser printed particles throughout this mass so that about 90% or greater of the ink and laser printed particles are reduced in size to about 160 micron or less in diameter. Ink particle reduction to such small sizes has in the past resulted in successful ink particle separation using conventional flotation separation and washing techniques.

After the simultaneous pulping and dispersion step in accordance with the invention, the need for a subsequent dispersing step is drastically reduced. This presents tremendous savings in machine cost and floor space requirements.

After the waste paper has been simultaneously pulped and ink dispersed therein, the high solids viscous mixture may be diluted to a concentration of about 2 to 5% solids for passage through a coarse screen having openings on the order of 0.050" to 0.125" whereby large impurities will be maintained on the screen and accordingly purged from the process stream.

Downstream from the coarse screen, the process stream may be further diluted to about 0.8 to 1.0% solids and forwarded to a centrifugal cleaner wherein high specific gravity impurities are separated from the pulped, process stream.

A variety of other separatory devices may be employed downstream from the initial centrifugal cleaning step, ending in a final washing and thickening stage that provides a 5 to 12% solids deinked pulp stock ready for bleaching and/or feed to the paper making fourdrinier or cylinder machine.

The invention will be further described in conjunction with the following detailed description and appended drawings.

BRIEF DESCRIPTION OF THE DRAWING

FIG. I is a schematic flow diagram illustrating a process in accordance with the invention;

FIG. 3 is an exploded perspective view of a preferred kneading apparatus used in the process;

FIG. 3A is a diagrammatic view in top plan showing the preferred screw flight arrangement for the apparatus shown in FIG. 3.

FIG. 4 is a schematic flow diagram illustrating another process in accordance with the invention

DETAILED DESCRIPTION OF THE PREFERRED EMBODIMENTS

Figure 1:
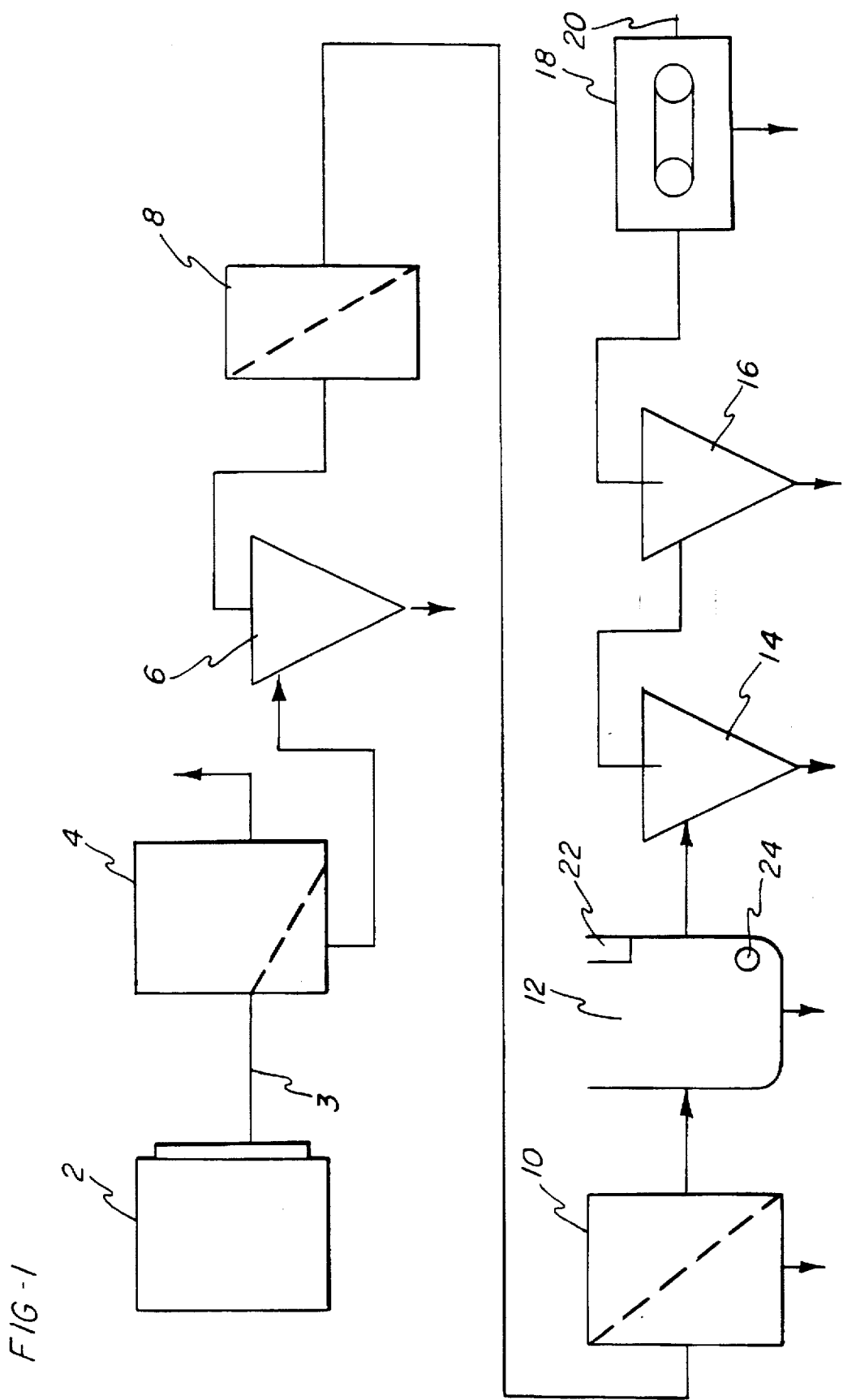

Turning now to FIG. 1, ran, untreated office waste paper is fed to pulping and kneading station 2. Water is added to result in a high solids content viscous mixture having greater than about 20 wt. % solids, preferably between about 20–80 wt. % solids. At this station the waste paper is formed into a homogenous mass of substantially discrete fibers and dispersed ink particles, the latter of which are dispersed throughout the homogenous high solids content mixture.

The type of device to be used as the simultaneous pulping and kneading station 2 is not critical. A variety of machines will suffice. For example, in addition to the twin screw arrangement shown, conventional ball mill, banbury, Hobart mixers and Lannoye kneader-pulpers and other mixing or kneading devices may also be mentioned.

For the simultaneous pulping and ink (including laser jet print particles) dispersion step, the important criteria are that a high solids content aqueous mixture be mechanically subjected to compression and shearing action. It is thought that the high solids content requirement improves the shearing action especially and, in contrast to the normal low solids (i.e. 5–8%) or medium solids (8–20%) dispersion or kneading processes, imparts a frictional force on the waste paper, thereby improving ink particle dispersion and particle size reduction.

Based upon presently available data, it is desired to perform the simultaneous pulping and dispersion step at a solids content of 20–80 wt. %. More preferably, the solids content will be 30–70 wt. % with the range most preferably being 40–60 wt. %. Preliminary data suggest that about 50% solids is optimum.

Figure 2:
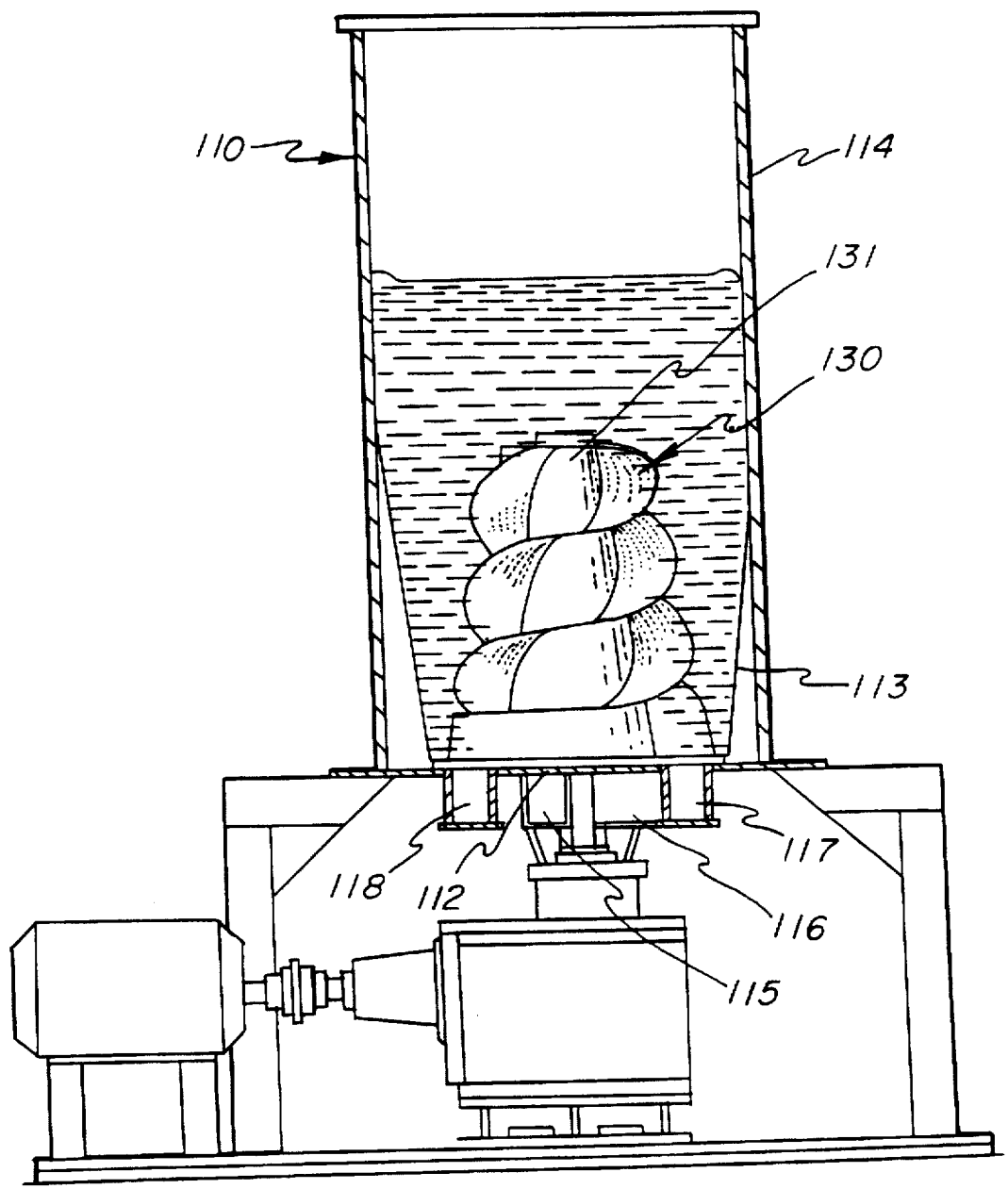
FIG. 2 is a schematic view partly in side elevation and partly in section of a pulping and kneading apparatus that may be used in the process.

The presently preferred apparatus for the step of simultaneous pulping and dispersing is shown in FIG. 3. FIG. 2 depicts a specially designed "Hi-Con" pulper sold by Black Clawson Company, Middletown, Ohio that can also, but less preferably, be used to effect simultaneous pulping and dispersing. This "Hi-Con" pulper is described in detail in U.S. Pat. 4,535,943, the disclosure of which is incorporated by reference herein.

With specific attention to FIG. 2, the pulper includes pulping tub, generally designed 110, having a bottom wall comprising an extraction plate 112 surrounded by tapered wall portion 113 and a generally cylindrical side wall 114 extending upwardly therefrom.

Below the extraction plate 112 is an annular accepts chamber 115 having a tapered bottom 116 and an outlet pipe 117 having a conventional control valve (not shown). An additional outlet 118 is provided for reject material too large for passage through the extraction plate 112.

A rotor, generally designated 120, is mounted centrally of the bottom wall for rotation about a substantially vertical axis. The rotor 120 is preferably driven by an electric motor (not shown) in a manner well-known in the art and disclosed, for example, in Couture U.S. Pat. No. 4,109,872, disclosure of which is incorporated herein by reference. Extending upwardly from the rotor hub of the rotor 120 is a feed screw 130 which includes a core section 131 forming an upwardly tapering continuation of the rotor hub. This apparatus provides necessary compressive and shearing forces on the high solids, viscous aqueous mixture so as to effectively transform raw office waste or the like into a mass of substantially discrete fibers with ink and other friable contaminants substantially uniformly dispersed throughout the fibrous mass.

Another suitable apparatus for station 2 is described in U.S. Pat. No. 4,993,649, the disclosure of which is incorporated herein by reference. This device is a twin screw device in which the screws rotate in opposite directions. Each screw shaft is tapered in its diameter and, in the preferred embodiment, the tapers are disposed in opposite directions. That is, the taper direction for one of the screws extends from left to right (large o.d. to smaller o.d.) whereas the other screw taper (large o.d. to smaller o.d.) extends from right to left.

Other machines which may be used with some modification to effect simultaneous pulping and dispersion include those depicted in U.S. Pat. Nos. 3,533,563 (Eriksson); 3,064,908 (Hjelte); 4,284,247 (Eriksson); 4,339,084 (Eriksson); 4,393,983 (Eriksson); 4,586,665 (Eriksson); 4,732,335 (Eriksson); 4,732,336 (Eriksson); and 4,655,406 (Eriksson). The disclosures of these patents are incorporated by reference herein.

Turning back to FIG. 1 in the device 2, the ink particles, including laser jet ink particles are dispersed and reduced to size whereby about 90% or greater of the particles, after working in the device 2, have particle diameters of about 160 microns or less.

The high solids content pulped and dispersed ink mixture 3 is then diluted to a solids concentration of about 2 to 3% and forwarded to purge screen 4 located downstream from device 2. Screen 4 has apertures that are suitably sized to remove larger debris and waste from the process stream so that the slurry can be pumped and processed further.

After the process slurry is forwarded through the purge screen, it may be diluted to a solids consistency of about 1½ to 2% and is then injected into a liquid cyclonic cleaner 6 of the type well known in the art in which liquids/solids separation is effected via centrifugal action with the higher specific gravity articles "the heavies" exiting at the bottom and the desired, cleaned pulped slurry leaving at the top of the device. These devices are commercially available from The Black Clawson Company, Middletown, Ohio under the "Liquid Cyclone" trademark.

The slurry is then fed to coarse screen 8 and fine screen 10 located downstream from liquid cyclone cleaners 6. The coarse screen may for instance comprise screen openings of about 0.050 inches to 0.125 inches and the fine screen having openings of about 0.004 to 0.010 inches.

Located downstream from screen 10 is a wet separation step, namely air froth flotation device 12. This may for example be a IIM-BC Flotator available from Black Clawson. This device comprises air inlet 24 which forms bubbles in the vat to aid in floating ink and other floatable contaminants to the surface of the liquid where they are separated via weir 22. The separation efficacy of these machines benefits the formation of small particle sizes and from good separation of the particles from the paper fibers.

The slurry may then be further diluted to about 0.5% to 1.0% solids and fed to liquid cyclonic cleaner stations 14,16, which may comprise, respectively, "X-Clone" and "Ultra-Clone" cyclonic cleaners available from Black Clawson. These, of course, provide further cleaning, removing ink and other contaminants that may remain in the slurry.

As shown, the slurry exiting cyclone cleaning station 16 is forwarded to washer 18 which may, for instance, be a "D.N.T." washer available from Black Clawson. Here the influent slurry is usually fed to the washer at about 0.5% to 1.0% solids with the resulting washed paper stock 20 exiting the washer being on the order of about 9 to 12% solids. The washed stock 20 is ready for paper forming operations or bleaching and/or neutralizing processes prior to paper formation.

In another embodiment (not shown) the high solids content viscous mixture exiting station 2 may be diluted and then fed through a coarse screen followed by a fine screen. Then, it may be fed through a cyclonic cleaner train similar to 14,16 shown in FIG. 1, followed then by a flotation cell 12 and washer 18.

It is to be understood that in accordance with one aspect of the invention, the office waste paper containing secondary fibers is fed to the pulping and dispersion station 2 without any need for pre-pulping whatsoever (i.e. there is no pulping station upstream from station 2). Additionally, it is noted that the waste paper may be fed to station 2 in the form of bales, without any pretreatment, or it may be sorted, shredded or in loose form. If desirable, chemical additives, gases, or steam may be added before or during the step of simultaneous pulping and dispersing at station 2.

It is apparent that the disclosed process eliminates or drastically reduces the need for traditional multiple thicken, disperse and float method steps. Stated differently, after the simultaneous pulping and dispersing step, no subsequent ink dispersion step is needed prior to formation of the paper stock 20. Also, save for the use of the washer 18 to form the paper stock 20, no additional washing or thickening is required.

While the invention has been described primarily with regard to its use in conjunction with office waste paper, it is noted that other recyclable fiber sources may be included. For example, old magazines and old newspapers may also be processed in accordance with the invention. All of these are within the scope of the phrase "secondary fibers" which phrase should be construed to include all non-virgin fiber sources.

Additionally, although the present disclosure has emphasized the desirable attributes of simultaneously pulping and dispersing the ink on secondary fibers, the invention can be more generally viewed as involving simultaneous pulping and dispersion of other easily friable contaminants. Included within the ambit of the phrase "friable contaminants" are such items as thermoplastic coatings, varnishes, sizes, plasticizers, as well as the inks including xerographical and laser print inks as referred to above. Accordingly, use of the simultaneous pulping and dispersion step has proven successful in transforming the waste paper into a homogenous mass of substantially discrete fibers, separating adhering particles from the fibers, and dispersing the friable particles throughout the mass so that a large majority (i.e. about 70% and greater, preferably 90% or greater) of the particles are reduced in size to about 160 microns or less in diameter.

Turning now to FIG. 3 there is shown the preferred apparatus for performing the required dispersion of friable contaminants in a high solids content waste paper/water mixture. The apparatus 200 comprises interconnected side wall members 202, 204, 206, 208 and a bottom member 210 attached to and underlying the sidewall members to define a housing.

Viewing now both FIGS. 3 and 3A, first screw shaft 212 and second screw shaft 214 are disposed in substantially parallel relationship extending through the housing and are journalled in appropriate bearings (only the front or proximal side bearings 216,218 being shown for simplicity of illustration). Each of the screw shafts 212,214 has a proximal end 220, 222, and a distal end 224,226.

Screw shaft 212 comprises a proximal sector 228 located toward proximal end 220 and a distal sector 230 located toward the distal end side of the shaft 212. The shaft 212 carries radially extending screw flights 240 located in the proximal sector 228 with the flights being interrupted proximate the midpoint 232 along the length of the shaft 212.

The distal sector 230 of the first screw shaft includes screw flights 20 242 that have a hand (i.e., pitch) opposite from the pitch of flights 240. As shown, flights 240 gradually increase in diameter proceeding from the proximal direction towards the distal direction (i.e. towards midpoint 232) within proximal sector 228. In contrast, the commencement of the flights 242 proximate midpoint 232 of the shaft 212 starts with a larger diameter flight tapering, as one proceeds toward the distal end 224 of shaft 212, with a smaller diameter flight proximate distal end 224. It is noted that there is an interruption in the flights 240,242 located close to midpoint 232. This interruption defines the boundary between the proximal sector flights 240 and the distal sector flights 242.

Screw shaft 214 comprises a proximal sector 234 located toward proximal end 222 and a distal sector 236 located toward the distal end side 226 of shaft 214. Midpoint 248 of the second shaft delineates the break or boundary between these two sectors. The shaft 214 carries radially extending screw flights 244 extending from a proximal to distal direction along proximal sector 234. Similarly, screw flights 246 extend from a proximal to distal direction along the distal sector of the shaft 214 with midpoint 248 providing a boundary between the proximal and distal sectors and location for interruption of the flighting along shaft 214.

Flights 244 in FIG. 3A comprise a hand or pitch that is opposite from the pitch of the flights 246. Flights 244 are tapered to decrease as one progresses from a proximal to distal direction along proximal sector 234 of shaft 214 so that the flight diameter of the flighting of the proximal sector 234 flights is smallest at the location proximate midpoint 248. Conversely, the flights 246 along the distal sector of shaft 214 gradually increase from the midpoint location proceeding in a distal direction to a larger diameter flight present adjacent distal end 226.

As shown, it is preferred to provide the following hands (pitches) to the flights:

| Flights 240 | Right Hand |
| Flights 242 | Left Hand |
| Flights 244 | Right Hand |
| Flights 246 | Left Hand |

Additionally, during operation, preferred shaft rotations are imparted with shaft 212 rotated in a clockwise direction with shaft 214 rotated in a counterclockwise direction. This action and the hands of the flights provide a turbulent, high shear, kneading zone concentrated towards the center of the shafts (as defined between the midpoints 232,248) with the kinetic action of the screws conveying the high solids mixture under shaft 212, dividing it and conveying it to the proximal end 220 and distal end 224 of the first shaft 212. From these locations, the movement vectors are such that the worked and kneaded material is forced by the shaft 214 towards the midpoint 248, where the conveying kneading and working cycle begins once again.

Conventional means such as an electric motor, speed reducer and gear train or pulley drive may be used to rotate the shafts. The optimization of shaft rotational speeds, gearing ratios and motor horse power requirements are within the ordinary skill of the art.

Turning back to FIG. 3, a drain 252 is provided along the bottom wall of the apparatus so that the high solids waste paper mixture with dispersed friable contaminants therein can be removed for further processing in accordance with the inventive methods. A valve or the like (not shown) regulates the quantity and timing of the drainage.

The bottom wall is provided with interconnected first, second, third, and fourth frusto conically-shaped sections 254, 256, 258, 260, each resembling generally the frustum of a cone when viewed in plan and each provided with an arcuate cross-sectional contour. These sections underlie the proximal and distal sectors of the shafts 212,214 and are arranged so that the major and minor radii of each frustum are disposed congruently with the screw flight diameter tapering of the flights 240, 242, 244, 246. That is, underlying the flights 240, first frusto20 conical section 254 is disposed with its minor radius located toward proximal end 216 and its major radius disposed approximately under and parallel to midpoint 232 of the first shaft. The second section 256 underlies screw flights 242 and is axially contiguous with section 254 with its major radius located at the midpoint 232 and the minor radius of section 256 located adjacent distal end 224.

In similar manner so as to match the taper of the flights 244,246 carried by shaft 214, third bottom sector 258, in the shape of a frustum, is disposed under the flighting 244 with the major radius of sector 258 disposed adjacent proximal end 222 and the minor radius disposed under midpoint 248. Sector 260 is axially contiguous with sector 258 and underlies flighting 246. The minor radius of the frustum sector 260 is located under midpoint 248 and the major radius of the section 260 is disposed under the distal end 226 of shaft 214.

The arcuate surfaces of the sectors 254, 256, 258, and 260 are positioned relative to the shafts so that they will provide a small clearance between the radially extending outward extremities of the screw flighting and the sector surfaces defining the bottom of the housing. Based on preliminary observations, clearances of about 0.5–2.0 inches are preferred.

In order to aid in the compression and kneading action needed to effect the desired degree of dispersion of the friable contaminants and the degree of defibering of the waste paper, teeth 250 may be provided along the outward edges of the screw flights. Additionally, radially extending arcuate ribs 262 may be provided adjacent the surfaces of sector 254, 256, 258, and 260 facing the screw shafts.

In order to better illustrate the white water or effluent handling and capital expenditure savings realized by the instant methods and to show another waste paper treatment process in accordance with the invention, process flow diagram FIG. 4 is included. Turning now to this drawing, the desired waster paper in baled form, loose, whole, presorted or in preshredded form is fed to station 2, which preferably is the apparatus 200 shown and described in conjunction with FIGS. 3 and 3A of the drawings. Here, materials such as steam water or chemicals, or auxiliary materials or combinations may be applied.

The moisture content of the waste paper is controlled to provide a high solids content as previously indicated. The waste paper in the mixture is subjected to shear and compression forces at the station 2 to effect dispersion of the ink and other friable constituents as stated above. The waste paper can either be completely or partially defibered at the station 2. In this regard, non defibered clumps of paper may be either recycled back into the station 2 or they may be forwarded to a separate defiberator located downstream from the station 2.

The waste paper worked in station 2 is discharged when the desirable degree of dispersion of friable contaminants has been achieved or the kneading action within the station can be continued until the desired degree of defibering has taken place.

The aqueous mixture containing dispersed friable materials may then be diluted as by the addition of white water thereto as shown at inlet 402. The resulting slurry may then be detrashed in a pressure screen 4 followed by subsequent dilution as indicated at 404. The diluted slurry is then cleaned via action of cyclone 6 followed by subsequent dilution 406 and screening as shown at 8. Additional white water is added at 408 followed by another cyclonic cleaning shown as 8a. The slurry is then diluted at 410 and fed to fine screen 10 and flotation unit 12 with intervening dilution shown at 412.

The separated liquor from the flotation unit is diluted at 414 then fed to another cyclone 16a, reverse cyclone 16 and then washed to a consistency of about 5–20%, preferably 10% at washer 18. White water effluent from the washer 18 is clarified at 418 and recycled as dilution water prior to any of the steps 4, 6, 8, 8a, 10, 12, or 16.

An optional bleach train consisting of an oxygen bleach tower 450, peroxide tower 452 and FAS bleach station 454 can be disposed along the process stream prior to storage of the deinked or decontaminated pulp in storage chest 460.

In contrast to prior art approaches in which the waste water is diluted to a low or medium solids content during pulping followed by friable contaminant dispersion, the instant process is characterized by inclusion of only a single effluent return line and clarifier to recycle dilution water to the cleaning and flotation steps. As indicated previously, conventional deinking processes normally require a plurality of thickening, dispersing and flotation steps with attendant white water effluent drain, hold, and recycle tanks, clarifiers, and fluid flow lines connected with each thickener. The present invention, due to its high solids content dispersion step, eliminates the need for repetitious downstream thickening, dispersing, and flotation steps thereby reducing capital expenditure for such equipment and its associated white water recycling lines and ancillary equipment.

While there are shown and described presently preferred embodiments of the invention, it is to be understood that the invention is not limited thereto, but may be otherwise variously embodied and practiced within the scope of the following claims.

What is claimed is:

1. Method of treating secondary fibers including ink containing waste paper comprising simultaneously pulping said waste paper and dispersing ink particles therefrom in a high solids content aqueous mixture having a solids content of greater than about 20 wt. % solids, said method being devoid of any step of pre-pulping said waste paper prior to said step of simultaneously pulping and dispersing wherein said step of simultaneously pulping said waste paper and dispersing ink particles therefrom comprises kneading said secondary fibers, said method further comprising subsequent to said step of simultaneously pulping and dispersing, diluting said kneaded secondary fibers with water and subsequently wet separating said ink particles from said diluted secondary fibers, and wherein said method is devoid of any additional step of dispersing said ink.

2. Method of treating secondary fibers as recited in claim 1 wherein in said step of simultaneously pulping said waste paper and dispersing ink particles therefrom about 90% and greater of said ink particles are reduced in size to particle sizes of about 160 microns or less.

3. Method as recited in claim 1 wherein said waste paper comprises raw, office waste paper.

4. Method as recited in claim 1 wherein said high solids content aqueous mixture has a solids content of between about 30–70 wt. % solids.

5. Method as recited in claim 1 wherein said high solids content aqueous mixture has a solids content of between about 40–60 wt. %.

6. Method as recited in claim 1 wherein said high solids content aqueous mixture has a solids content of about 50 wt. %.

7. Method of deinking secondary fibers containing ink particles thereon comprising concurrently pulping waste paper to form a homogenous mass of substantially discrete secondary fibers and dispersing said ink particles in said mass by kneading said secondary fibers in a high solids content aqueous mixture comprising at least about 30 wt. % solids wherein said waste paper has not been pulped prior to said step of concurrent pulping and dispersing.

8. Method as recited in claim 7 further comprising subsequent to said step of concurrent pulping and dispersing, diluting said kneaded secondary fibers with water and wet separating said ink particles from said diluted secondary fibers.

9. Method as recited in claim 8 wherein during said step of concurrent pulping and dispersing, about 90% or greater of said ink particles are reduced in size to particles of about 160 microns or less.

10. Method as recited in claim 8 wherein said high solids content aqueous mixture comprises from about 30–70 wt. % solids.

11. Method as recited in claim 10 wherein said high solids content aqueous mixture comprises from about 40–60 wt. % solids.

12. Method as recited in claim 11 wherein said high solids content aqueous mixture comprises from about 50 wt. % solids.

13. Method as recited in claim 8 wherein said wet separation comprises washing said diluted secondary fibers.

* * * * *